United States Patent [19]
Yamamoto

[11] Patent Number: 5,416,526
[45] Date of Patent: May 16, 1995

[54] SOUND AND IMAGE REPRODUCTION SYSTEM

[75] Inventor: Yuji Yamamoto, Yawata, Japan

[73] Assignee: Sanyo Electric Co., Ltd., Moriguchi, Japan

[21] Appl. No.: 217,701

[22] Filed: Mar. 25, 1994

Related U.S. Application Data

[62] Division of Ser. No. 937,752, Sep. 1, 1992, Pat. No. 5,335,073.

[30] Foreign Application Priority Data

Sep. 2, 1991 [JP] Japan .................. 3-221783

[51] Int. Cl.$^6$ .............................................. H04N 7/08
[52] U.S. Cl. .................................... 348/484; 348/10; 348/478; 360/19.1; 455/63; 84/645
[58] Field of Search ............... 360/19.1; 455/6.1, 6.3; 84/600, 601, 645; 348/7, 10, 738, 484, 482, 478; H04N 7/08, 7/04

[56] References Cited

U.S. PATENT DOCUMENTS

| | | | |
|---|---|---|---|
| 4,419,920 | 12/1983 | Ohe | 84/602 |
| 4,896,224 | 1/1990 | Tobe et al. | 360/19.1 |
| 4,920,424 | 4/1990 | Hosaka et al. | 360/19.1 |
| 5,252,775 | 10/1993 | Urano | 348/7 |
| 5,321,200 | 6/1994 | Yamamoto | 84/645 |

Primary Examiner—James J. Groody
Assistant Examiner—Jeffrey S. Murrell
Attorney, Agent, or Firm—Armstrong, Westerman, Hattori, McLeland & Naughton

[57] ABSTRACT

Based on a series of video data for producing one or a plurality of text displaying images and a series of accompaniment MIDI data, a signal processing circuit (1) prepares a quasi video signal containing the two kinds of data as arranged in alternating fields or in alternating pluralities of fields in time series and identification data for identifying the series of video data and MIDI data. The quasi video signal is transmitted to terminal units (5) for users via a CATV or like transmission path. The terminal unit extracts from the quasi video signal fields of MIDI data and video data containing identification data specifying a piece of music selected by the user, and reproduces the accompaniment of the selected piece and displays the text thereof based on the extracted data.

6 Claims, 8 Drawing Sheets

SOUND AND IMAGE REPRODUCTION SYSTEM

This is a Rule 60 division of application Ser. No. 07/937,952, filed Sep. 1, 1992, now U.S. Pat. No. 5,335,073.

FIELD OF THE INVENTION

The present invention relates to sound and image reproduction systems utilizing the MIDI (Musical Instrument Digital Interface) standard which is generally used worldwide as a standard for interfaces for controlling sound source devices for musical instruments such as keyboards through communication, and more particularly to recording media having recorded thereon sound signals according to the MIDI standard (MIDI data) along with video data, reproduction systems for the recording media, and systems for transmitting and receiving quasi video signals containing MIDI data.

In data communication according to the MIDI standard, data is handled in the unit of "messages" comprising a plurality of bytes. Further according to the MIDI standard, up to a maximum of 16 channels are settable, whereby 16 musical instruments are individually independently controllable, for example, with use of a single MIDI cable.

Such "messages" contain channel voice messages, which are classified according to the function. These messages include, for example, a note on message corresponding to a "sound production" operation, and a note off message corresponding to a "sound stopping" operation.

The sound source device to be controlled by MIDI signals starts an operation to produce a sound with predetermined interval and tone in a predetermined volume in response to one message and thereafter terminates the sound production operation in response to another message. In the simplest case, therefore, the sound source device can be caused to continuously produce a specified sound for a predetermined period of time if the device is given a message as to the musical interval, sound volume and tone, a sound production starting message and a sound production terminating message intermittently with predetermined timing.

In the case where a specified sound is output only for a predetermined period of time with MIDI signals in this way, there is no need to continuously feed a sound signal over the output period unlike sound reproduction with audio tape recorders or the like, but the MIDI signals are fed to the sound source device intermittently, so that the specified sound can be output with a greatly reduced amount of data.

MIDI signals are usually stored in media in a format adapted for computer communication along with timing data for controlling the output timing of each message.

So-called "KARAOKE" systems for enjoying songs to the accompaniment of music reproduced from disclike recording media are in increasing household and business use in recent years.

Heretofore used as such KARAOKE systems are video disc players having a sound mixing function, such that the sound signal of an accompaniment obtained by reproduction from a video disc and the sound signal of a song input from a microphone are mixed together to release sounds from a speaker. Further the images of a text as reproduced from the video disc are successively presented on the screen of a display in synchronism with the reproduction of sound signal of the accompaniment.

Accordingly, the user can sing a desired song with reference to its text on display and at the same time enjoy background pictures corresponding to the music.

However, in the case where the conventional KARAOKE system is used for a plurality of persons to enjoy KARAOKE at the same time at different locations, a corresponding number of KARAOKE systems are needed each of which must be equipped with a set of video discs.

Consequently, there arises the problem of necessitating a multiplicity of video discs as a whole.

SUMMARY OF THE INVENTION

An object of the present invention is to provide a system adapted to reproduce sounds and images at different places using a common source (such as a video disc).

Another object of the invention is to provide a system adapted to immediately acquire a desired program comprising a series of sounds and images from the common source to reproduce the sounds and images at different places.

Another object of the invention is to provide a sound and image reproduction system which comprises a signal transmitter and a signal receiver and in which when the signal transmitter transmits a common source reproduction signal, the signal receiver is capable of immediately obtaining and reproducing a desired program.

The signal transmitter comprises signal processing means and signal transmitting means.

Based on a series of video data for producing one or a plurality of images and MIDI data for producing a series of sounds corresponding to the video data, the signal processing means prepares a quasi video signal containing the two kinds of data as arranged in alternating fields or in alternating pluralities of fields in time series and identification data for distinguishing the series,of video data and MIDI data from other series of video data and MIDI data.

The signal transmitting means transmits the quasi video signal to the signal receiver.

On the other hand, the signal receiver comprises signal receiving means and a plurality of terminal units. The signal receiving means receives the quasi video signal from the signal transmitter.

The terminal units, which are adapted to reproduce desired sounds and images from the quasi video signal received, each comprise selection means for preparing identification data for specifying the sounds and images to be reproduced, signal processing means for extracting from the received quasi video signal the series of video data and MIDI data containing the selection signal prepared by the selection means, sound emitting means for outputting the MIDI data extracted by the signal processing means as sounds, and display means for outputting the video data extracted by the signal processing means as images.

With the sound and image reproduction system described, the signal transmitter cyclically produces a quasi video signal for constituting a plurality of programs from a common source, and transmits the video signal to the signal receiver.

When an optional one of the terminal units of the signal receiver is operated to select a desired program, the selection means thereof prepares identification data for specifying the program and feeds the data to the signal processing means.

The signal processing means extracts the series of video data and MIDI data containing the identification data from the received quasi video signal.

The extracted MIDI data is output as sounds from a speaker or like sound emitting means, and at the same time, the extracted video data is output as images on a CRT or like display means.

Accordingly, when the signal transmitter is equipped with a common source and even when a plurality of terminal units of the signal receiver simultaneously select the same program, the desired program selected can be reproduced at the terminal units with a very short waiting time.

Another object of the invention is to provide a signal recording medium which, based on a series of video data for producing one or a plurality of images and MIDI data for producing a series of sounds corresponding to the video data, has recorded thereon a quasi video signal containing the two kinds of data as arranged in alternating fields or in alternating pluralities of fields in time series and identification data for distinguishing the series of video data and MIDI data from other series of video data and MIDI data.

Still another object of the invention is to provide a sound and image reproduction system which comprises pickup means for reproducing the quasi video signal from the signal recording medium, and a plurality of terminal units for selecting a desired program, producing the corresponding sounds and displaying the corresponding images.

The terminal units each comprise selection means for preparing identification data for specifying the sounds and images to be reproduced, signal processing means for extracting from the received quasi video signal the series of video data and MIDI data containing the selection signal prepared by the selection means, sound emitting means for outputting the MIDI data extracted by the signal processing means, and display means for outputting the video data extracted by the signal processing means.

With the above sound and image reproduction system, the pickup means cyclically produces a quasi video signal for forming a plurality of programs from a common source (one or a plurality of video discs) and feeds the signal to the terminal units at the same time.

When an optional one of the terminal units is operated to select a desired program, the selection means thereof prepares identification data for specifying the program and feeds the data to the signal processing means.

The signal processing means extracts the series of video data and MIDI data containing the identification data from the received quasi video signal.

The extracted MIDI data is output as sounds from a speaker or like sound emitting means, and at the same time, the extracted video data is output as images on a CRT or like display means.

For example when the above sound and image reproduction system is provided as a KARAOKE system, texts can be displayed in the form of still pictures, so that the amount of data needed is very small. For example when the entire text of one piece of music is to be displayed on a screen, at least one field of NTSC signal provides the still picture data needed.

On the other hand, the MIDI data for accompaniments is a kind of control signal for controlling the sound source, so that the amount of data for one piece of music can be very small. For example when the sound source comprises several kinds of instruments including a piano, flute, etc., the MIDI data for one piece of music can be provided by several fields of NTSC signal. Accordingly, the accompaniment and images for one piece of music can be given by up to tens of fields of NTSC signals.

Suppose the accompaniment and image data for one piece of music is to be provided by 30 fields of NTSC signals. Since the transmission of one field of NTSC signal requires 1/60 second, the data for one piece of music can be transmitted in 1/60×30=0.5 second. Accordingly, when the signals, for example, for 120 pieces of music are cyclically transmitted, a desired one of these pieces can be selected with a waiting time of up to 1 minute for displaying still pictures including the text concerned and reproducing the accompaniment.

In the case of the above KARAOKE system, one set of video discs can be used in common by the terminal units, which therefore need not be provided with the same set individually.

DETAILED DESCRIPTION OF EMBODIMENTS

The present invention will be described below in detail with reference to the drawings and to a case wherein the invention is embodied as a KARAOKE reproduction system.

Figure 1:
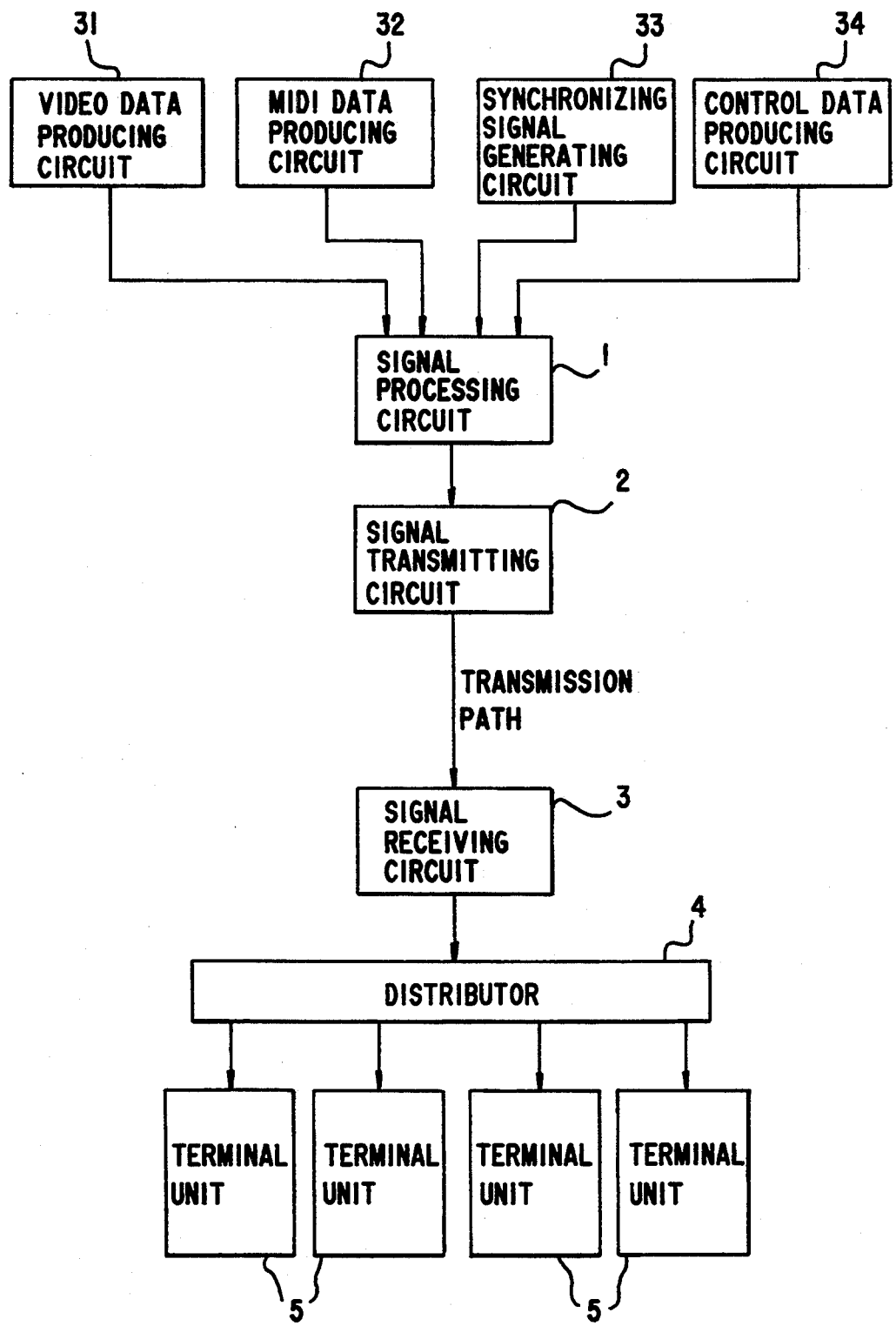
FIG. 1 is a block diagram showing the construction of a sound and image reproduction system embodying the invention.

FIG. 1 shows an example of system for transmitting a quasi video signal from a local broadcasting station to houses in the local area by the NTSC method via CATV or like video signal transmission path.

Figure 3:
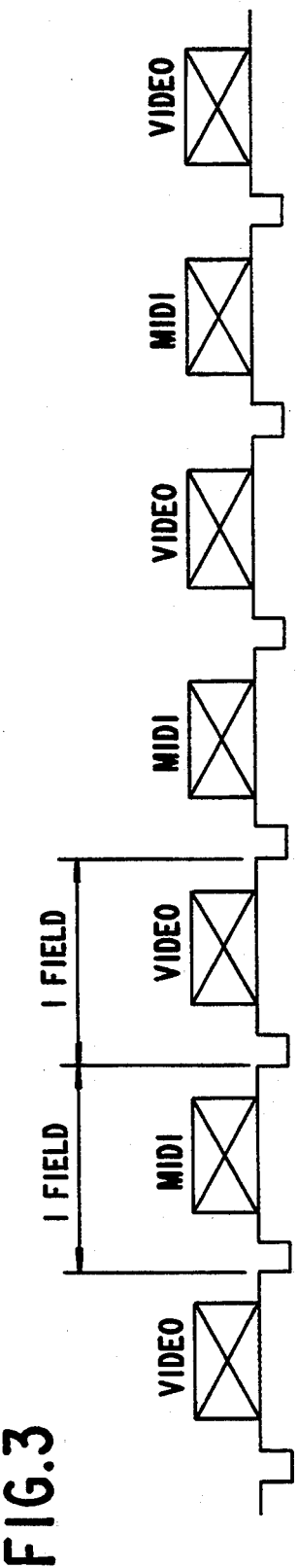
FIG. 3 is a time chart showing an example of arrangement of video data and MIDI data in a quasi video signal.
Figure 4:
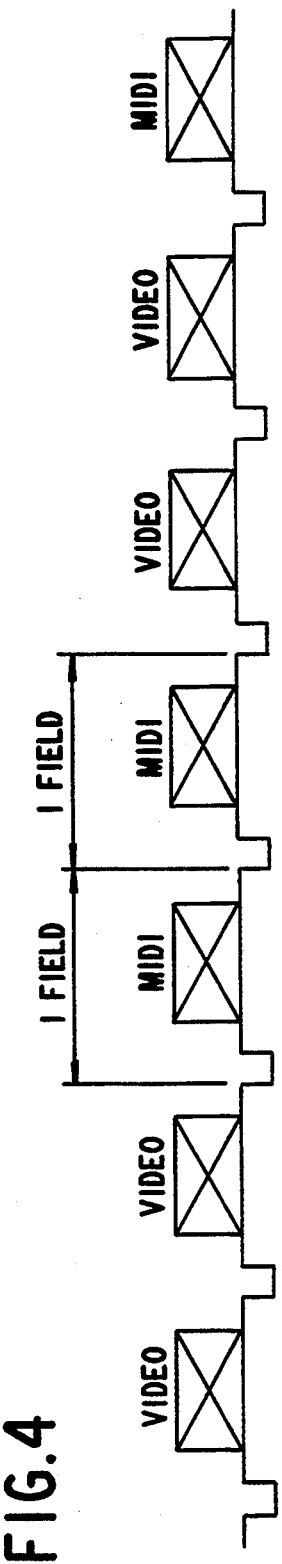
FIG. 4 is a time chart showing another example of arrangement of video data and MIDI data in a quasi video signal.

Usable as the quasi video signal are the one shown in FIG. 3 and containing text displaying still picture video data and accompaniment reproducing MIDI data as arranged in alternating fields cyclically, or the signal shown in FIG. 4 and containing still picture video data and MIDI data as arranged in alternating pluralities of fields.

As shown in FIG. 1, the signal transmitter to be installed in the local broadcasting station comprises a video data producing circuit 31, MIDI data producing circuit 32, synchronizing signal generating circuit 33 and control data producing circuit 34. The output terminals of these circuits are connected to a signal processing circuit 1.

The video data producing circuit 31 comprises a video tape recorder or the like, and the MIDI data producing circuit 32 comprises a microcomputer or the like.

In the signal processing circuit 1, a series of video data in the form of one or a plurality of fields and delivered from the video data producing circuit 31, and a series of MIDI data in the form of one or a plurality of fields and delivered from the MIDI data producing circuit 32 are alternately rearranged in time series as stated above, and have added thereto a vertical synchronizing signal and a horizontal synchronizing signal, whereby these items of data and signals are converted to a quasi video signal in an NTSC format.

Furthermore, control data is fed from the control data generating circuit 34 to the signal processing circuit 1 and added to the quasi video signal of NTSC format. The control data includes identification data for selecting a desired piece of music.

Figure 5:
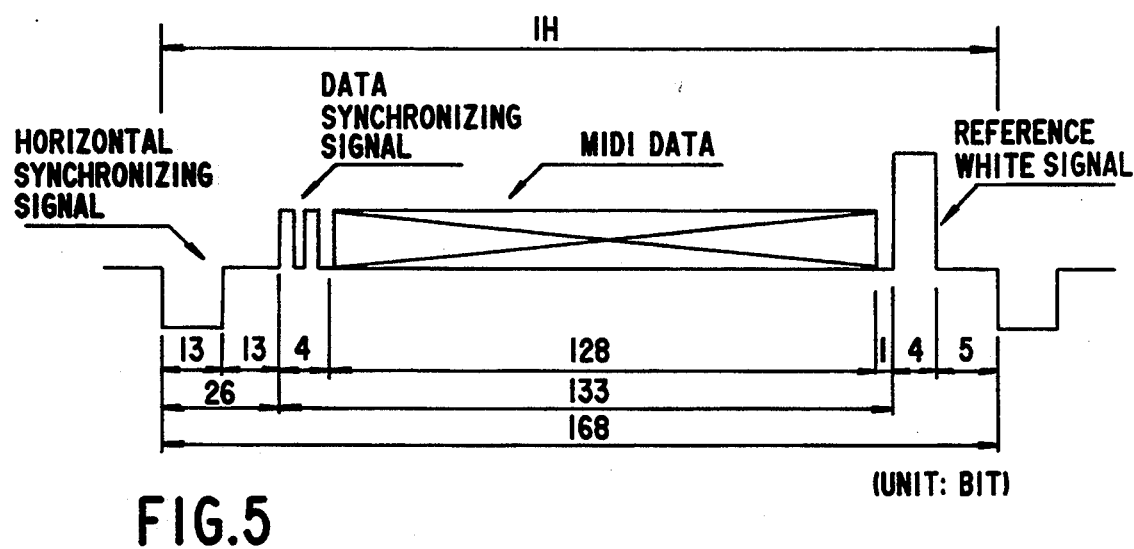
FIG. 5 is a waveform diagram showing the data structure of a quasi video signal containing MIDI data during one horizontal scanning period (1H)
Figure 6:
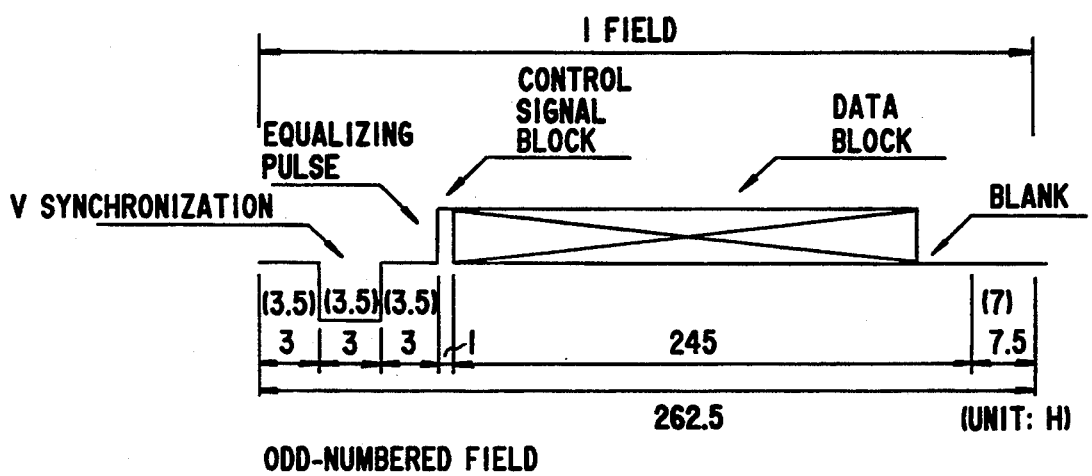
FIG. 6 is a waveform diagram showing the data structure in one field period of the quasi video signal.

FIGS. 5 and 6 show the data structure of the quasi video signal in a period in which the MIDI data is recorded. As seen in FIG. 5, arranged on a horizontal scanning line are a data synchronizing signal to the front of a MIDI data recording portion and a reference white signal to the rear thereof. Further as shown in FIG. 6, a data arrangement of 1 field period includes an equalizing pulse of 3H period serving as an end porch and followed immediately by a control signal block of 1H period and further by 245H period in which a data block is positioned for recording the series of MIDI data.

Figure 7:
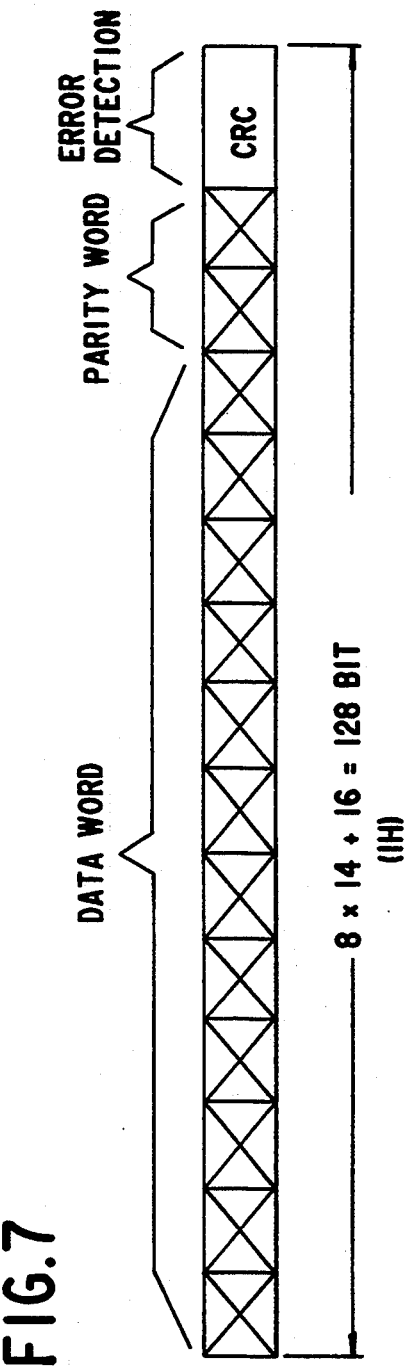
FIG. 7 is a diagram showing the data structure in one horizontal scanning period of the MIDI data.

With reference to FIG. 7 showing the MIDI data, one item of data comprises 8 bits, and 14 items of data are arranged in 1H period (128 bits). Of these, 16 bits in the rear are utilized as a parity word. Further the last 16 pits of 1H period provide a CRC signal for error detection.

Figure 8:
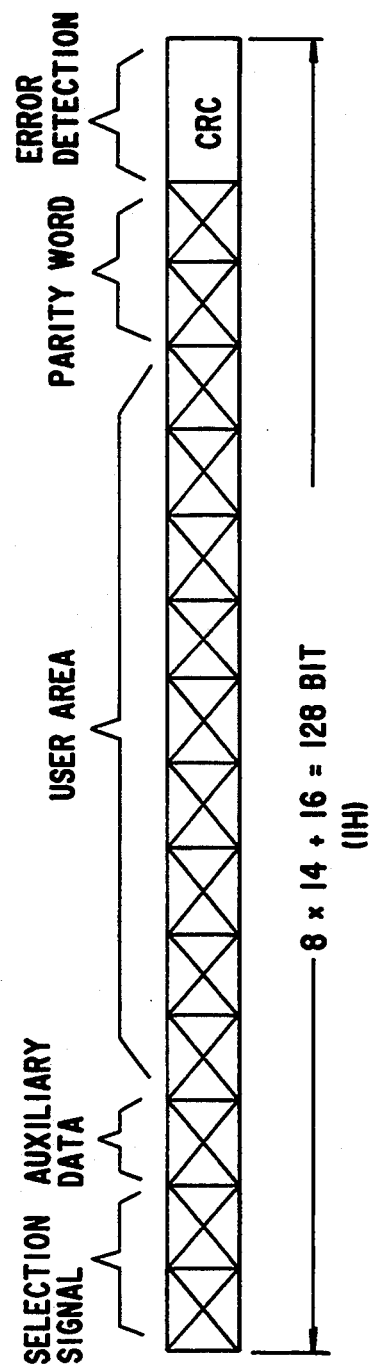
FIG. 8 is a diagram showing the data structure in one horizontal scanning period of a control signal block.

FIG. 8 shows the control signal block, in which the first 16 bits are assigned as a selection signal for selecting a desired piece of music. Of these bits, the MSB as set to "1" indicates the head data of music. When set to "0", it indicates data subsequent to the head data. The remaining 15 bits represent a piece number as identification data.

The MIDI data and video data for one piece of music are each to be transmitted as a plurality of successive fields. Which of the video data and the MIDI data proceeds is optional.

The selection signal is followed by 8-bit auxiliary data, which shows distinction between the video data and the MIDI data and represents the number of one of the plurality of fields. More specifically, the MSB of the 8 bits, when "1", represents video data. When "0", the bit represents MIDI data. The remaining 7 bits represent a field number.

For example, the auxiliary data as to the first field of video data is "10000001", and the auxiliary data as to the next field thereof is "10000010". Further the auxiliary data as to the first field of MIDI data is "00000001", and the auxiliary data as to the next field thereof is "00000010".

The auxiliary data is followed by a 9-byte user area which is available to the user for recording, for example, the name of music, name of singer, etc.

Figure 9:
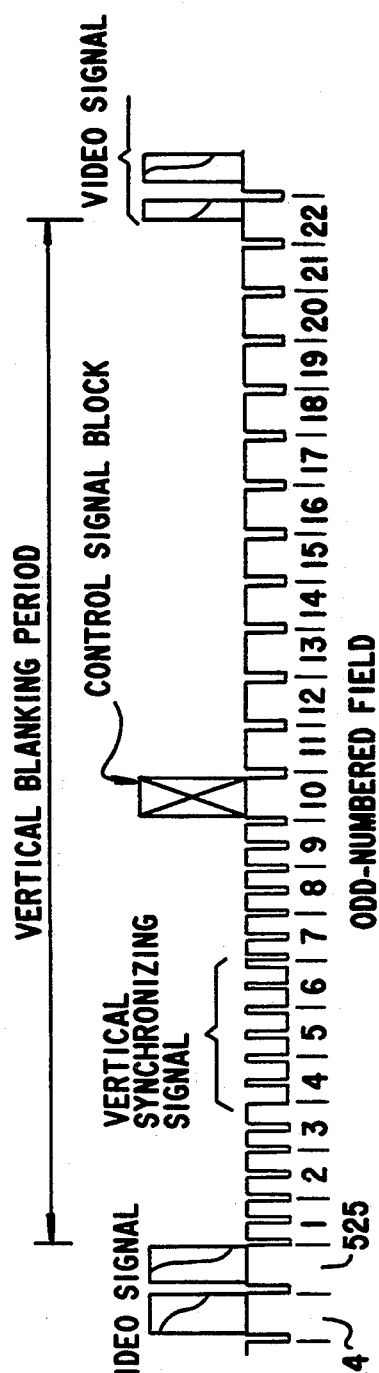
FIG. 9 is a waveform diagram showing the data structure in a vertical blanking period of odd-numbered field of a quasi video signal containing video data in one field period.
Figure 10:
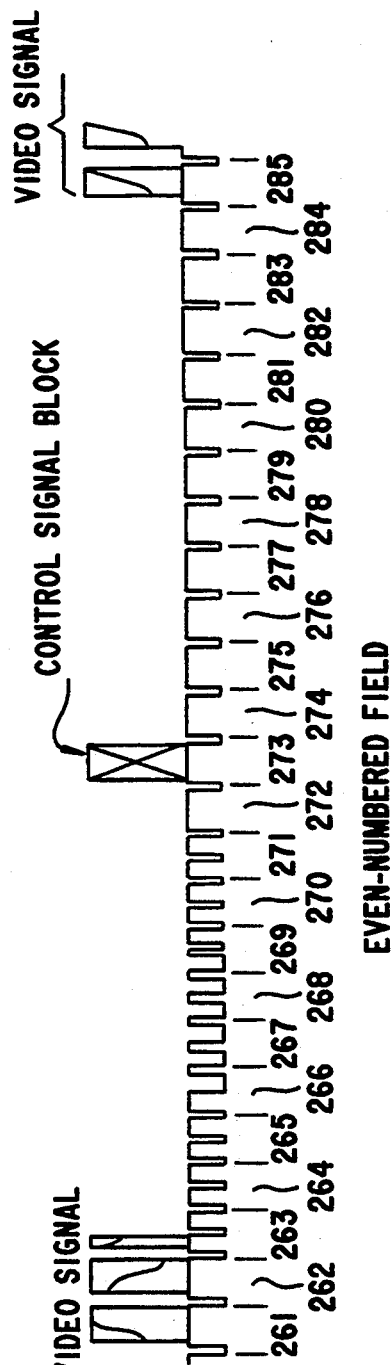
FIG. 10 is a waveform diagram showing the data structure in a vertical blanking period of even-numbered field of the quasi video signal.

With reference to FIGS. 9 and 10 showing the data structure of the quasi video signal in the video data recording period thereof, a control signal block is assigned to the 10th H in a vertical blanking period in the case of an odd-numbered field or to the 273rd H thereof in the case of an even-numbered field.

The position of assignment of the control signal block for the video data is the same as the position of assignment of the control signal block for the MIDI data shown in FIG. 6. Further the data structure of the control signal block for the video data is the same as the data structure of the control signal block for the MIDI data shown in FIG. 8.

The quasi video signal prepared by the signal processing circuit 1 is fed to a signal transmitting circuit 2 and transmitted to a signal receiver upon frequency modulation or amplitude modulation.

The signal cable of the CATV system is utilized as a transmission path from the signal transmitter to the signal receiver.

The signal receiver has a signal receiving circuit 3 for receiving the quasi video signal from the transmitter and subjecting the signal to frequency demodulation or amplitude demodulation. The output terminal of the signal receiving circuit 3 is connected in parallel with a plurality of terminal units 5 via a distributor 4. The quasi video signal demodulated by the signal receiving circuit 3 is fed to the terminal units 5 at the same time by way of the distributor 5.

Figure 2:
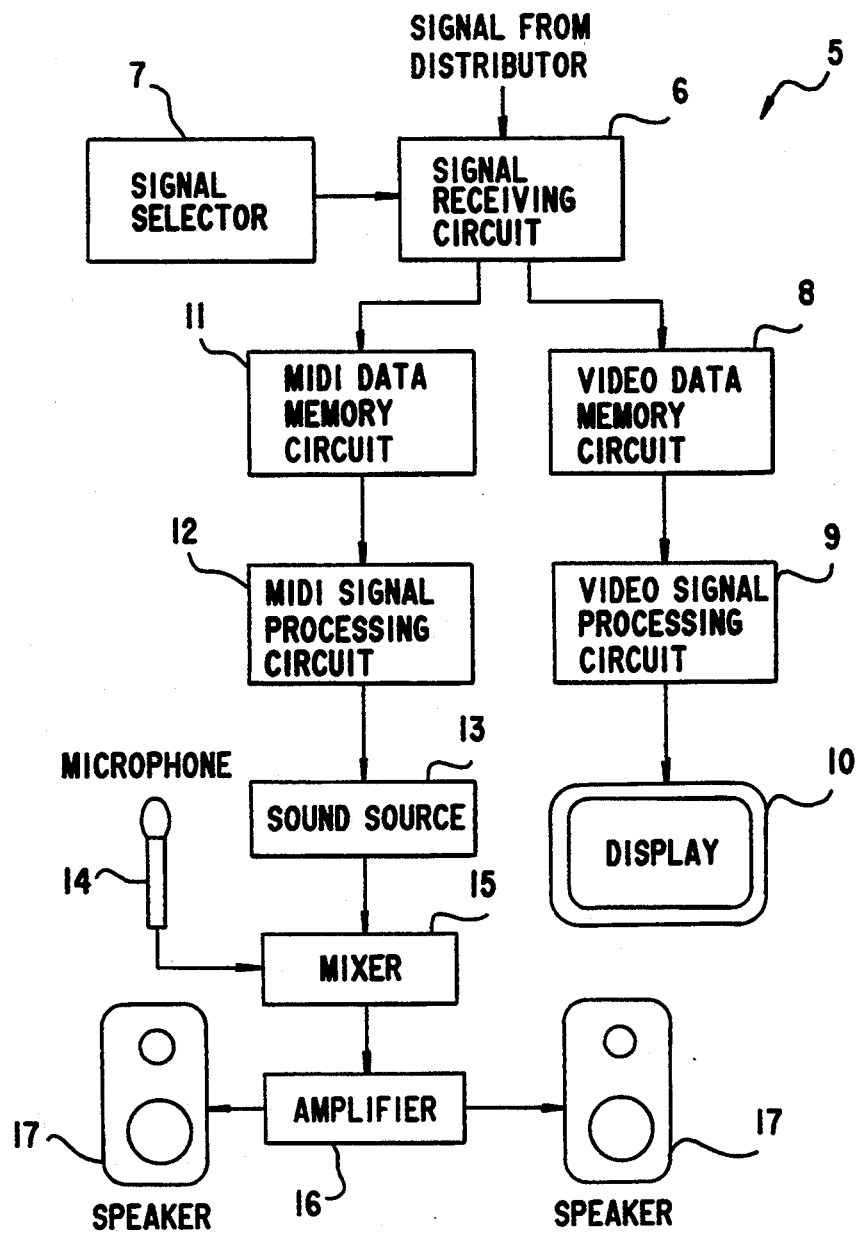
FIG. 2 is a block diagram showing the construction of a terminal unit in a KARAOKE system embodying the invention.

The terminal units 5 are provided for users at their houses. As shown in FIG. 2, each of the terminal units 5 has a signal receiving circuit 6 for receiving the quasi video signal from the distributor. Connected to the receiving circuit 6 is a signal selector 7 which is operated by the user to select desired pieces of music.

The signal selector 7 has a plurality of keys for the user to manipulate for entering the number of his desired piece of music. The data as to the piece number (identification data) generated by key manipulation is fed to the signal receiving circuit 6.

The receiving circuit 6 extracts from the received quasi video signal a plurality of fields containing the piece number specified by the signal selector 7, and further separates the signals of the plurality of fields into a series of MIDI data and a series of video data based on the auxiliary data.

The series of MIDI data separated off is fed to a MIDI data memory circuit 11, and the series of video data separated off to a video data memory circuit 8. The memory circuits 11, 8 respectively store the MIDI data and the video data concerning one piece of music and sent forward from the signal receiving circuit 6, and each have writing and reading control circuits (not shown). The video data memory circuit 8 has an A/D converter at its data input portion and a D/A converter at its data output portion.

Figure 11:
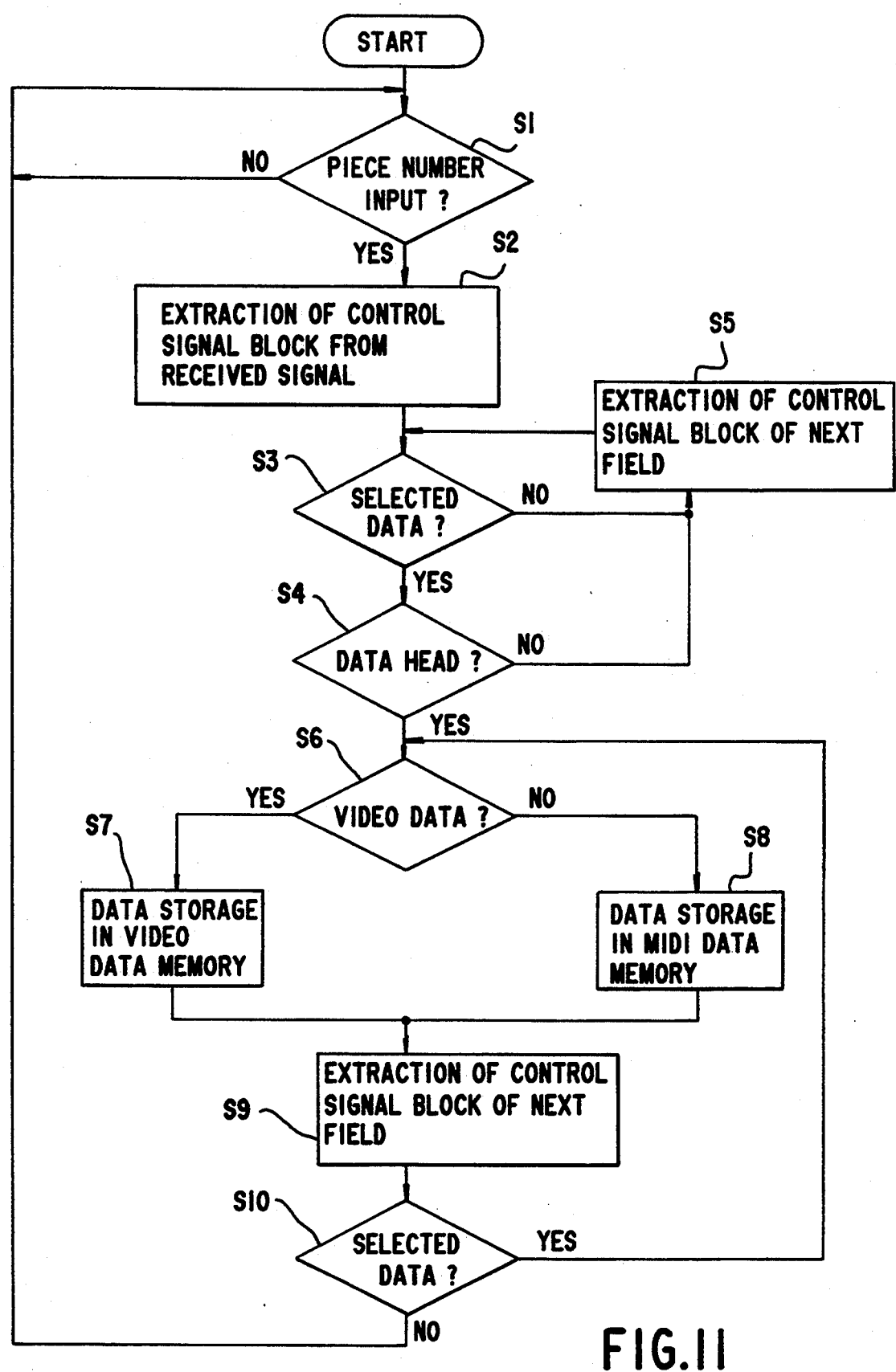
FIG. 11 is a flow chart showing a procedure for extracting desired video data and MIDI data from a quasi video signal.

FIG. 11 shows the operation of the signal receiving circuit 6 and the two memory circuits 11, 8.

First, an inquiry is made in step S1 as to whether data representing the number of one piece of music has been selected by the signal selector 7. If the answer to the inquiry is YES, a control signal block is extracted from the received quasi video signal in step S2.

In the next step S3, an inquiry is made as to whether the selection signal in the control signal block contains the data as to the selected piece. When the answer is NO, the control signal block of the next field is extracted in step S5, followed by the inquiry of step S3 again. When the answer is YES, an inquiry is made as to whether the data extracted based on the selection signal is head data in step S4. If the answer is NO, the sequence returns to step S5.

When the answer to the inquiry of step S4 is YES, an inquiry is made in step S6 based on the auxiliary data as to whether the quasi video signal of the received field is video data. If the answer is YES, step S7 follows, in which one field of video data is stored in the video data memory circuit. When the answer is NO, one field of MIDI data is stored in the MIDI data memory circuit in step S8.

Subsequently, the control signal block of the next field is extracted in step S9, and step S10 inquires whether the selection signal in the control signal block contains data as to the number of the selected piece. When the answer is YES, the sequence returns to step S6 to continue data storage. If the answer is No, on the other hand, the sequence returns to step S1 to wait for the subsequent input of piece number data.

The above procedure stores the video data and MIDI data as to the selected piece of music in the video data memory circuit 8 and the MIDI data memory circuit 11, respectively, followed by retrieval of the stored data from the memory circuits.

With reference to FIG. 2, the data read from the MIDI data memory circuit 11 is fed to a MIDI signal processing circuit 12, which has a so-called MIDI sequencer incorporated therein and by which the data from the memory circuit 11 is restored to a MIDI signal having a regular format. The MIDI signal is thereafter fed to a sound source device 13 in a predetermined sequence.

The sound source device 13 in turn produces an accompaniment audio signal and feeds the signal to a mixer 15, to which a microphone 14 is connected. The accompaniment audio signal is mixed with a song audio signal, and the resulting mixture signal is fed to a pair of opposite speakers 17, 17 via an amplifier 16 to emit sounds.

On the other hand, the data read from the video data memory circuit 8 is fed to a video signal processing circuit 9 and made into one frame of video signal through a known interpolation process. The signal is fed to a display 10, which shows the text concerned in the form of a still picture.

The MIDI signal processing circuit 12 and the video signal processing circuit 9 are held in synchronism by an unillustrated control circuit to make the accompaniment emitted from the speakers 17 correspond to the text on the display 10.

With the KARAOKE reproduction system utilizing a CATV system, a quasi video signal containing a multiplicity of pieces of music is fed from a single local broadcasting station to terminal units at houses, such that when a desired piece of music is selected at the terminal unit, the accomaniment for the desired music can be obtained with little or no waiting time, with the text of the music displayed as still pictures on a TV screen.

Figure 12:
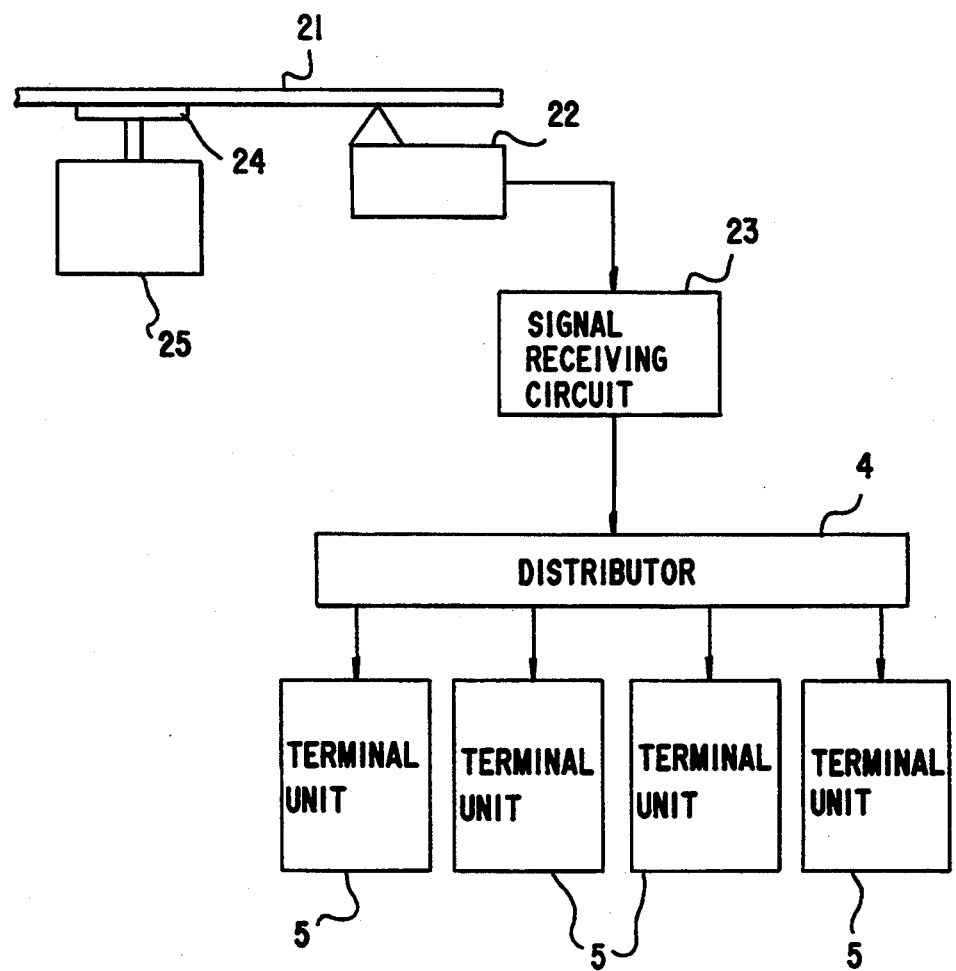
FIG. 12 is a block diagram showing the overall construction of a KARAOKE system embodying the invention.

FIG. 12 shows a KARAOKE SYSTEM for simultaneously reproducing sounds and images from a video disc 21 which has the foregoing quasi video signal recorded thereon. The quasi video signal is recorded on the video disc, as converted to a signal of the NTSC type as in the foregoing embodiment and thereafter modulated as specified.

As is the case with conventional video disc players, the video disc 21 is placed on a turntable 24 drivingly rotatable by a motor 25, and a pickup 22 is provided as opposed to the signal bearing surface of the video disc 21. The pickup 22 is connected to a signal processing circuit 23 having the same construction as the conventional one for processing the output of the pickup 22 as by demodulation to obtain a quasi video signal. This signal is fed to a multiplicity of terminal units 5 at the same time via a distributor 4. The terminal unit 5 has the same construction as the one shown in FIG. 2.

With the above KARAOKE system, the amounts of still picture video data and MIDI data per piece of music are less than those required for the conventional KARAOKE system, with the result that more pieces of music can be recorded on one video disc, while the time required for selecting a desired piece of music from the video disc and reproducing the music can be shorter.

Accordingly, even in the case where users select the same piece of music at some of a multiplicity of terminal units connected to the single pickup, the accompaniment and text of the desired piece are available with a small waiting time.

The embodiments described above are given for the illustration of the present invention and should not be interpreted as limiting the invention as defined in the appended claims or reducing the scope thereof. The components of the system of the invention are not limited to those of the embodiments in construction but can of course be modified variously by one skilled in the art without departing from the spirit of the invention.

For example, the quasi video signal is transmitted utilizing the CATV system according to the embodiment described, whereas this mode of transmission is not limitative; the signal may be transmitted through some other system, for example, a television broadcasting system with use of radio waves. Further although the quasi video signal of the embodiments has the video signal format of NTSC, PAL or SECAM video signal format is alternatively usable. Furthermore, the signal recording medium for the KARAOKE system is not limited to a video disc but can be a magnetic tape.

What is claimed is:

1. A signal recording medium which, based on a series of video data for producing one of a plurality of images and MIDI data for producing a series of sounds corresponding to the video data, has recorded thereon a quasi video signal containing the two kinds of data as arranged in alternating fields or in alternating pluralities of fields in time series and identification data for distinguishing the series of video data and MIDI data from other series of video data and MIDI data, the identification data being written in a control signal block provided in a vertical blanking period of the quasi video signal.

2. A signal recording medium as defined in claim 1 wherein the quasi video signal has a television broadcasting signal format.

3. A system for reproducing sounds and images from a signal recording medium which, based on a series of video data for producing one of a plurality of images and MIDI data for producing a series of sounds corresponding to the video data, has recorded thereon a quasi video signal containing the two kinds of data as arranged in alternating fields or in alternating pluralities of fields in time series and identification data for distinguishing the series of video data and MIDI data from other series of video data and MIDI data, the system comprising pickup means for reproducing the quasi video signal from the signal recording medium, and a plurality of terminal units for reproducing desired sound and images from the quasi video signal reproduced from the pickup means, each of the terminal units comprising:

selection means for preparing identification data for specifying the sounds and images to be reproduced, signal processing means for extracting from the received quasi video signal the series of video data and MIDI data containing the selection signal prepared by the selection means, sound emitting means for outputting the MIDI data extracted by the signal processing means, and display means for outputting the video data extracted by the signal processing means.

4. A system as defined in claim 3 wherein the quasi video signal has a television broadcasting signal format.

5. A system as defined in claim 4 wherein the identification data is written in a control signal block provided in a vertical blanking period of the quasi video signal.

6. A system as defined in claim 3 wherein the signal processing means of the terminal unit has memory means for storing a series of MIDI data and a series of video data, and feeds the MIDI data and the video data read out from the memory means to the sound emitting means and the display means respectively.

* * * * *